United States Patent
Scholl et al.

[19]

[11] Patent Number: 5,977,225
[45] Date of Patent: Nov. 2, 1999

[54] RUBBER MIXTURES CONTAINING POLYSULPHIDE POLYETHER SILANES

[75] Inventors: Thomas Scholl, Bergisch Gladbach; Hermann-Josef Weidenhaupt, Pulheim; Heinrich Königshofen, Bergisch Gladbach; Ulrich Eisele, Leverkusen, all of Germany

[73] Assignee: Bayer AG, Leverkusen, Germany

[21] Appl. No.: 09/034,618

[22] Filed: Mar. 4, 1998

[30] Foreign Application Priority Data

Mar. 11, 1997 [DE] Germany .......................... 197 09 873

[51] Int. Cl.⁶ ...................................................... C08K 5/24
[52] U.S. Cl. .......................... 524/262; 524/155; 524/265; 556/427; 556/428
[58] Field of Search .................... 556/427, 428; 524/262, 155, 265

[56] References Cited

U.S. PATENT DOCUMENTS 4,709,065 11/1987 Yoshioka et al. .
5,827,912 10/1998 Scholl ...................................... 524/155

FOREIGN PATENT DOCUMENTS

| 447 066 | 9/1991 | European Pat. Off. . |
|---|---|---|
| 2 141 159 | 3/1973 | Germany . |
| 2 141 160 | 3/1973 | Germany . |
| 2 255 577 | 6/1974 | Germany . |
| 44 06 947 | 9/1995 | Germany . |
| 195 49 027 | 12/1996 | Germany . |

*Primary Examiner*—Melvyn I. Marquis
*Assistant Examiner*—Mark W. Milstead
*Attorney, Agent, or Firm*—Connolly Bove Lodge & Hutz LLP

[57] ABSTRACT

The rubber mixtures according to the invention, containing at least one rubber, a filler, optionally additional rubber auxiliaries and at least one polysulphide polyether silane corresponding to the formula

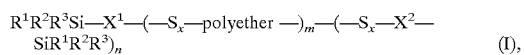

$$R^1R^2R^3Si-X^1-(-S_x-\text{polyether}-)_m-(-S_x-X^2-SiR^1R^2R^3)_n \quad (I),$$

are used for the preparation of rubber vulcanisates, from which in particular tires having a low rolling resistance associated with a good wet skid resistance and a high abrasion resistance can be produced.

8 Claims, No Drawings

RUBBER MIXTURES CONTAINING POLYSULPHIDE POLYETHER SILANES

The present invention relates to novel rubber mixtures containing polysulphide polyether silanes and to the use of these rubber mixtures for the preparation of rubber vulcanisates. The rubber mixtures according to the invention are suitable for the production of mouldings, in particular for the production of tyres having a low rolling resistance associated with a good wet skid resistance, a high abrasion resistance as well as a high dynamic and thermal loading capacity.

A number of proposals have been formulated for solving the problem of producing tyres having a decreased rolling resistance. In the German Offenlegungsschrift documents 2 141 159, 2 141 160 and 2 255 577 and in U.S. Pat. No. 4,709,065, certain organosilanes are described as reinforcing additives, in particular for rubber vulcanisates containing silica. The use of such organosilanes for the production of silica-filled tire treads is also described in EP 447 066. Through the combination of materials based on silica and of organosilanes, the rolling resistance of the tyres has been successfully decreased without, as is otherwise usual, impairing the abrasion resistance and the wet skid resistance of the tyres. However, large quantities of a costly silane raw material which is expensive to prepare are required for the preparation of the above-mentioned classes of compounds.

DE-A 44 06 947 and DE-A 19 54 9027 describe oligomeric reinforcing additives containing sulphur and silicon which, with a lower content of costly silane raw material, produce results equally as good as those for previously described compound having a higher silane content. A disadvantage, however, is that the solubility of compounds above a certain molecular weight decreases owing to the high polysulphide content and the addition of other non-polar solvents is necessary in order to carry out the reaction. As a result of this at least part of the acquired advantages of the raw materials is lost owing to the greater expenditure on processing in the preparation.

It has now been found that certain polysulphide polyether silanes, despite the far higher molecular weight, can be prepared in the same solvent as the low-molecular silanes. Furthermore the polysulphide polyether silanes according to the invention, despite their far lower Si content, when used as reinforcing additives in silica-filled rubber vulcanisates are equally as effective as the low-molecular silanes and possess additional advantages owing to improved vulcanisation kinetics in the preparation of vulcanisates as well as advantages in the dynamic hysteresis of the vulcanisates.

The present invention therefore provides rubber mixtures containing at least one rubber, a filler, optionally additional rubber auxiliaries and at least one. polysulphide polyether silane corresponding to the formula

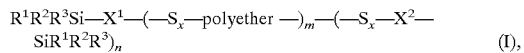

(I), wherein $R^1$, $R^2$ and $R^3$ are identical or different and denote $C_1$–$C_{18}$-alkyl, $C_1$–$C_{18}$-alkoxy, $C_6$–$C_{12}$-phenyl or -phenoxy, $C_7$–$C_{18}$-arylalkyl or alkylaryloxy, with the proviso that at least one of the groups $R^1$ to $R^3$ is an alkoxy, phenoxy or alkylaryloxy group, $X^1$ and $X^2$ are identical or different and representlent, linear or branched or cyclic, optionally unsaturated $C_1$–$C_{12}$-alkyl groups, polyether represents a bi-, tri- or tetrafunctional polyethylene oxide polyether group, polypropylene oxide polyether group, polybutylene oxide polyether group, or a corresponding mixed polyether group having an average molecular weight of from 300 to 5,000, m represents an integer from 1 to 20, n represents a number from 1 to 4, and x denotes a number from 1 to 8, the polysulphide polyether silane being used in quantities of from 0.1 to 15 wt. %, based on the quantity of the rubber used in each case.

The rubber mixtures according to the invention contain preferably from 0.1 to 10 wt. % of polysulphide polyether silane, particularly preferably 1 to 7.5 wt. %.

The rubber mixtures according to the invention contain preferably those poly-sulphide polyether silanes corresponding to the above formula, wherein $R^1$, $R^2$ and $R^3$ independently of one another denote methyl, ethyl, propyl or phenyl, with the proviso that at least one of the groups $R^1$ to $R^3$ represents a methoxy, ethoxy, propoxy, butoxy or phenoxy group, and that $X^1$ and $X^2$ denote methylene, propylene, butylene, pentylene or hexylene groups and that Y represents a poly-ethylene oxide group, polypropylene oxide group or a polyethylene oxide/poly-propylene oxide mixed polyether group having molecular weights of between 300 and 1500, which has been obtained by addition of at least 6 moles ethylene oxide and/or propylene oxide to an aliphatic or aromatic diol or amine and wherein n equals 1 and m denotes integers from 1 to 20.

Reinforcing additives corresponding to the formulae which follow below are particularly preferred:

(1)

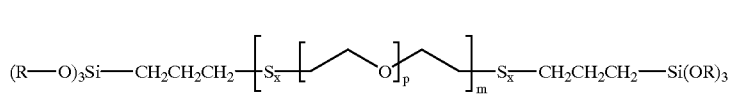

wherein R=$CH_3$, $C_2H_5$, x=1 to 8, p=5 to 30, m=1 to 20, (2)

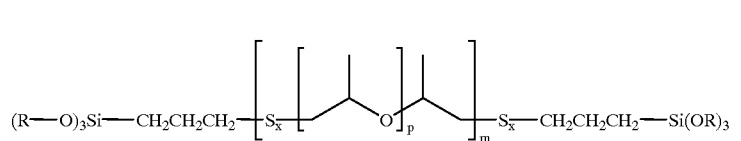

wherein R=CH$_3$, C$_2$H$_5$, x=1 to 8, p=5 to 30, m=1 to 20, (3)

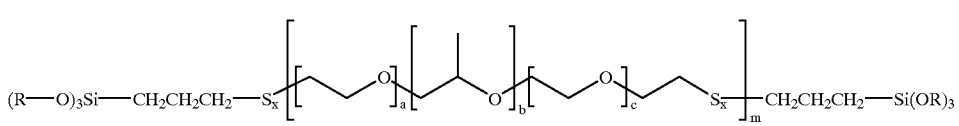

wherein R=CH$_3$, C$_2$H$_5$, C$_3$H$_7$, x=1 to 8, a=3 to 20, b=1 to 10, c=3 to 20, m=1 to 20, (4)

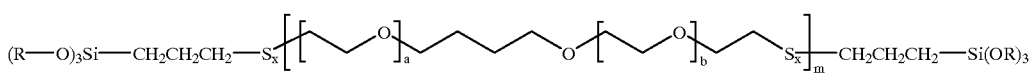

wherein R=CH$_3$, C$_2$H$_5$, C$_3$H$_7$, x=1 to 8, a=3 to 20, b=2 to 20, m=1 to 20, (5)

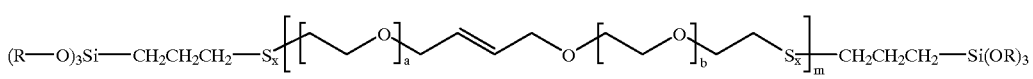

wherein R=CH$_3$, C$_2$H$_5$, C$_3$H$_7$, x=1 to 8, a=3 to 20, b=2 to 20, m=1 to 20, (6)

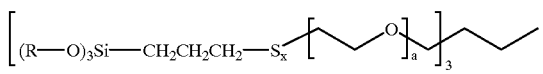

wherein R=CH$_3$, C$_2$H$_5$, C$_3$H$_7$, x=1 to 8, a=2 to 20, (7)

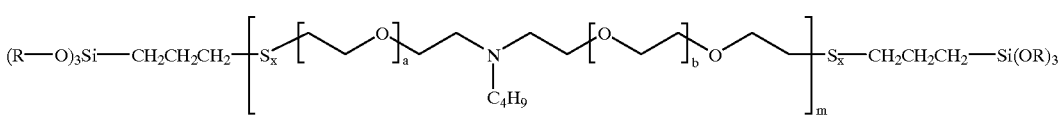

wherein R=CH$_3$, C$_2$H$_5$, C$_3$H$_7$, x=1 to 8, a=3 to 20, b=1 to 10 m=1 to 20.

Particularly preferred polysulphide polyether silanes are those corresponding to the following formula:

(8)

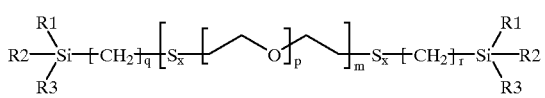

wherein R$_1$, R$_2$, R$_3$ denote methyl, phenyl, methoxy, ethoxy, propoxy, butoxy, with the proviso that at least one of the groups is a methoxy, ethoxy, propoxy or butoxy group q, r=1 to 3, x=1 to 8, p=6 to 30, m=1 to 20.

The polysulphide polyether silanes according to the invention may be used either individually or mixed with one another. In this connection either the individual compounds having a defined molecular weight may be used or mixtures of oligomers having a definite molecular weight distribution.

For processing reasons, it is easier to prepare a mixture of oligomers of the above-mentioned polysulphide polyether silanes and to use them in this form. If the reinforcing additives are used in the form of a mixture of oligomers, the latter has an average molecular weight of about 800 to 10,000 as determined by gel permeation chromatography.

The novel polysulphide polyether silanes according to the invention may be prepared in various ways:

A) By the reaction of silanes containing mercapto groups and dimercaptans and/or polymercaptans with sulphur dichloride or sulphur dichloride, with elimination of HCl. The reaction may be carried out in a known per se manner at temperatures of from −30° C. to +80° C., optionally in the presence of solvents, such as alcohols or aromatic hydrocarbons:

R$^1$R$^2$R$^3$Si—X—SH+HS—polyether—SH+S$_x$Cl$_2$ →R$^1$R$^2$R$^3$Si—X$_{x+2}$—(—polyether—S$_{x-2}$)$_m$—X—SiR$^1$R$^2$R$^3$ +HCl For details regarding carrying out the reaction, reference may be made to Houben-Weyl, Methoden der organischen Chemie, Volume 9, pages 88 ff., (1955) and Volume E 11 (1985), Thieme Verlag, Stuttgart.

B) The polysulphide polyether silanes according to the invention may be prepared particularly advantageously by reacting haloalkyl silyl ethers and polyhalides with metal polysulphides in the presence of alcoholic solvents at temperatures of from approximately −20° C. to +90° C.:

R$^1$R$^2$R$^3$Si—X—Hal+Hal—polyether—Hal+MeS$_x$→R$^1$R$^2$R$^3$Si—

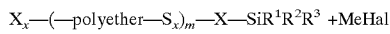

The metal polysulphides used are preferably those wherein Me represents lithium, sodium or potassium and x denotes a number from 2 to 8. The alcoholic solvents used are preferably methanol, ethanol, propanol, butanol, amyl alcohol, hexyl alcohol, octanol, ethylene glycol and propylene glycol, butanediol and/or hexanediol is well as isomers thereof.

The polysulphide polyether silanes according to the invention may be added either in pure form to the rubber mixtures, or may be added thereto mounted on an inert organic or inorganic support. Suitable support materials are in particular silicas, naturally occurring or synthetic silicates, aluminium oxide and carbon blacks.

Suitable fillers include both the fillers which are active for the rubber vulcanisates according to the invention and inactive fillers such as, for example:

- Highly disperse silicas, prepared, for example, by precipitation from solutions of silicates or by flame hydrolysis of silicon halides having specific surfaces of 5 to 1000 m$^2$/g, preferably 20 to 400 m$^2$/g (BET surface area) and having primary particle sizes of 100 to 400 nm. The silicas may optionally also be present as mixed oxides with other metal oxides, such as the oxides of Al, Mg, Ca, Ba, Zn, Zr and Ti.
- Synthetic silicates, such as aluminium silicates or alkaline-earth metal silicates, such as magnesium silicate or calcium silicate, having BET surface areas of 20 to 400 m$^2$/g and primary particle diameters of 10 to 400 nm
- Naturally-occurring silicates, such as kaolin and other naturally-occurring silicas
- Glass fibres and glass fibre products (mats, strands) or glass microbeads.
- Aluminium hydroxide or magnesium hydroxide
- Carbon blacks. The carbon blacks to be used here are produced by the lampblack process, furnace process or gas black process and have BET surface areas of 20 to 200 m$^2$/g, for example, SAF, ISAF, HAF, FEF, or GPF carbon blacks.

Highly-disperse silicas having BET surface areas of 20 to 400 m$^2$/g are preferably used.

The above-mentioned fillers are used in quantities of from 0 to 150 wt. %, preferably 10 to 100 wt. %, based on the quantity of the rubber used in each case.

The above-mentioned fillers may be used on their own or mixed with one another. In one particular embodiment, the rubber mixtures contain as fillers a mixture of light-coloured fillers, such as highly-disperse silicas, and carbon blacks, the mixing ratio of light-coloured fillers to carbon blacks being 0.05 to 20, preferably 0.1 to 10. The polysulphide polyether silanes (I) may be used on their own as cross-linking agents. Other cross-linking agents which may be used for the rubber mixtures according to the invention are, for example, sulphur and peroxides, to which may also be added the known vulcanisation accelerators, such as mercaptobenzothiazoles, mercaptosulphenamides, thiurams and thiocarbonates. Both the vulcanisation accelerators and the cross-linking agents may be used individually or mixed with one another. Sulphur is particularly preferred as a cross-linking agent. The cross-linking agents and the vulcanisation accelerators are each used in quantities of from 0.1 to 10 wt. %, preferably 0.1 to 5 wt. %, based on the rubber used in each case.

Other rubber auxiliaries may, of course, also be added to the rubber mixtures according to the invention; examples of these additives are antioxidants, heat stabilisers, light stabilisers, antiozonants, processing agents, plasticisers, tackifiers, blowing agents, dyes, pigments, waxes, extenders, organic acids, reaction retarders., metal oxides, such as zinc oxide and magnesium oxide, as well as activators such as triethanolamine, polyethylene glycol and hexanetriol, which are familiar to the rubber technologist.

The above-mentioned rubber auxiliaries are added in conventional quantities (0.to 50 wt. %, based on the rubber used in each case). The most favourable quantity of auxiliary substance used can easily be determined by preliminary tests and depends, incidentally, on the respective purpose of the rubber vulcanisates.

Besides natural rubber, synthetic rubbers are also suitable for the preparation of rubber mixtures according to the invention. Preferred synthetic rubbers are described, for example, in: W. Hofmann, Kautschuktechnologie, Gentner Verlag, Stuttgart, 1980. They include polybutadiene, butadiene-acrylic acid-$C_{1-4}$-alkyl ester copolymers, polychloroprene, polyisoprene, styrene-butadiene copolymers having styrene contents of 1 to 60 wt. %, preferably 20 to 50 wt. %, isobutylene-isoprene copolymers, butadiene-acrylonitrile copolymers having acrylonitrile contents of 5 to 60 wt. %, preferably 10 to 50 wt. %, partly hydrogenated or completely hydrogenated butadiene-acrylonitrile copolymers and ethylene-propylene-diene copolymers. The rubbers may, of course, also be used mixed with one another. Rubbers which are of interest for the production of automobile tyres are in particular anionically polymerised solution styrene-butadiene copolymers having a glass temperature of above −50° C., which optionally may be modified with silyl ethers or other functional groups, polybutadiene rubbers having a high 1,4-cis content (>90%), which are prepared using catalysts based on Ni, Co, Ti or Nd, polybutadiene rubbers having a vinyl content of 0 to 75% and mixtures thereof (see, for example, EP-A 447 066).

The rubber mixtures are prepared in the conventional manner, in known mixing units, such as rolls, closed mixers and mixer-extruders, at composition temperatures of 100° C. to 200° C. and at shear rates of 1 to 1000 s$^{-1}$.

The addition of the reinforcing additives according to the invention and the addition of the fillers is carried out preferably during the first part of the mixing process at composition temperatures of 100° C. to 200° C. and at the given shear rates. The additions may however also take place later at lower temperatures of 40° C. to 100C., for example, together with sulphur and vulcanisation accelerators.

The rubber mixtures according to the invention may be vulcanised in the conventional manner (see, for example, G. Alliger, I. J. Sjothun, Vulcanization of Elastomers, Reinhold Publishing Corporation, New York, 1964). The vulcanisation is carried out at temperatures of from about 100° C. to 200° C., preferably at 130° C. to 180° C., optionally at pressures of 10 to 200 bar.

The rubber vulcanisates according to the invention are particularly suitable for the production of moulded articles, for example, for the manufacture of cable sheaths, tubing, drive belts, conveyor belts, rollers, shoe soles, sealing rings and damping elements, but preferably for the production of tyres.

EXAMPLES

Example 1

Cl-Terminated Bifunctional Polyethylene Oxide Polyether Having a molecular weight of approx. 400

238 g thionyl chloride was added over a period of two hours at a temperature of 50° C. to 60° C. to 400 g of a polyethylene glycol having an average molecular weight of 400 and 0.5 g pyridine. The mixture was then heated by passing nitrogen through it for 18 hours at 65° C. to 70° C. and degassed for a further 3 hours in a vacuum (20 mbar) at 70° C. 418 g of a colourless oil having a viscosity of 40 mPa.s was obtained.
Elemental analysis:

|  | C | H | Cl |
|---|---|---|---|
| calculated: | 47.2% | 7.9% | 17.4% |
| found: | 47.2% | 7.8% | 15.5% |

Example 2
Cl-Terminated Bifunctional Polyethylene Oxide Polyether Having a molecular weight of approx. 600

The procedure was as described in Example 1, with 600 g of a polyethylene oxide polyether having an average molecular weight of 600 being reacted with 238 g thionyl chloride in the presence of 0.5 g pyridine. 624 g of a brown oil having a viscosity of 90 mPa sec was obtained.

Example 3
Cl-Terminated Bifunctional Polyethylene Oxide Polyether Having a molecular weight of approx. 900

The procedure was as described in Example 1, with 450 g of a polyethylene oxide polyether having an average molecular weight of 900 being reacted with 119 g. thionyl chloride in the presence of 0.5 g pyridine. 454 g of an almost colourless oil was obtained, which crystallised after a few days at room temperature. fp 35° C. to 40° C.
Elemental analysis:

|  | C | H | Cl |
|---|---|---|---|
| calculated: | 51.1% | 8.5% | 7.0% |
| found: | 51.3% | 8.5% | 7.4% |

Example 4
Cl-Terminated Bifunctional Polyethylene Oxide Polyether Having a molecular weight of approx. 1550

The procedure was as described in Example 1, with 750 g of a polyethylene oxide polyether having an average molecular weight of 1500 being reacted with 119 g thionyl chloride in the presence of 0.5 g pyridine. 755 g of an almost colourless oil was obtained, which crystallised on being cooled to room temperature.
Elemental analysis:

|  | C | H | Cl |
|---|---|---|---|
| calculated: | 52.8% | 8.6% | 4.5% |
| found: | 52.8% | 8.6% | 4.4% |

Example 5
$(C_2H_5O)_3Si—C_3H_6—S_4$ —polyether—$S_4$ —$C_3H_6$ —Si $(OC_2H_5)_3$ Containing a polyethylene oxide polyether having an average molecular weight of approx. 600

78 g (1 mol) anhydrous sodium sulphide and 96 g (3 mol) sulphur were heated in 500 ml dry ethanol at 70° C. for 30 minutes. 240.8 g (1 mol) 3-chloropropyltrieth-oxysilane was then added dropwise thereto, followed by 318.5 g (0.5 mol) of a Cl-terminated polyethylene oxide polyether obtained as in Example 2 and the mixture was stirred for 5 hours at 70° C. The mixture was cooled and then filtered and the precipitated NaCl was filtered off. After evaporation, 604 g of a brown oil having a viscosity of 230 mPa sec was obtained.
Elemental analysis:

|  | C | H | S | Si |
|---|---|---|---|---|
| calculated: | 42.6% | 7.6% | 20.2% | 4.4% |
| found: | 42.7% | 7.4% | 20.3% | 4.8% |

Example 6
$(C_2H_5O)_3Si—C_3H_6—S_4$—polyether—$S_4$—$C_3H_6$—Si $(OC_2H_5)_3$

Containing a polyethylene oxide polyether having an average molecular weight of approx. 400

The procedure was as described in Example 5, with 78 g (1 mol) anhydrous sodium sulphide and 96 g (3 mol) sulphur being heated in 500 ml dry ethanol at 70° C. for 30 minutes. 240.8 g (1 mol) 3-chloropropyltriethoxysilane was then added dropwise thereto, followed by 203.5 g (0.5 mol) of a Cl-terminated polyethylene oxide polyether obtained as in Example 1 and the mixture was stirred for 5 hours at 70° C. The mixture was cooled and then filtered and the precipitated NaCl was filtered off. After evaporation, 506 g of a brown oil having a viscosity of 120 mPa sec was obtained.
Elemental analysis:

|  | C | H | S | Si |
|---|---|---|---|---|
| calculated: | 40.7% | 7.4% | 25.6% | 5.6% |
| found: | 42.0% | 7.4% | 24.0% | 5.2% |

Example 7
$(C_2H_5O)_3Si—C_3H_6—S_4$—polyether —$S_4$—$C_3H_6$ —Si $(OC_2H_5)_3$ Containing a polyethylene oxide polyether having an average molecular weight of approx. 900

The procedure was as described in Example 5, with 62.4 g (0.8 mol) anhydrous sodium sulphide and 76.8 g (2.4 mol) sulphur being heated in 500 ml dry ethanol at 70° C. for 30 minutes. 192.4 g (0.8 mol) 3-chloropropyltriethoxysilane was then added dropwise thereto, followed by 381.2 g (0.4 mol) of a Cl-terminated polyethylene oxide polyether obtained as in Example 3 and the mixture was stirred for 5 hours at 70° C. The mixture was cooled and then filtered and the precipitated NaCl was filtered off. After evaporation, 644 g of a brown oil having a viscosity of 820 mPa sec was obtained, which crystallised after prolonged standing at room temperature. fp 35° C.
Elemental analysis:

|  | C | H | S | Si |
|---|---|---|---|---|
| calculated: | 44.9% | 7.9% | 16.2% | 3.6% |
| found: | 44.9% | 7.9% | 15.9% | 3.3% |

Example 8
$(C_2H_5O)_3Si—C_3H_6—S_4$—polyether—$S_4$—$C_3H_6$—Si $(OC_2H_5)_3$

Containing a polyethylene oxide polyether having an average molecular weight of approx. 1500

The procedure was as described in Example 5, with 39 g (0.5 mol) anhydrous sodium sulphide and 48 g (1.5 mol) sulphur being heated in 500 ml dry ethanol al 70° C. for 30 minutes. 120.4 g (0.5 mol) 3-chloropropyltriethoxysilane was then added dropwise thereto, followed by 375 g (0.25 mol) of a Cl-terminated polyethylene oxide polyether obtained as in Example 4 and the mixture was stirred for 5 hours at 70° C. The mixture was cooled and then filtered and the precipitated NaCl was filtered off. After evaporation, 535 g of a brown oil was obtained, which crystallised rapidly at room temperature. fp 50° C to 55° C.

Elemental analysis:

|  | C | H | S | Si |
|---|---|---|---|---|
| calculated: | 47.7% | 8.2% | 11.8% | 2.6% |
| found: | 47.6% | 8.2% | 11.8% | 2.6% |

Example 9

$(C_2H_5O)_3Si—C_3H_6 —(S_4—polyether)_3 —S_4 —C_3H_6 —Si(OC_2H_5)_3$

Containing a polyethylene oxide polyether having an average molecular weight of approx. 400

The procedure was as described in Example 5, with 78 g (1 mol) anhydrous sodium sulphide and 96 g (3 mol) sulphur being heated in 500 ml dry ethanol at 70° C. for 30 minutes. 120.4 g (0.5 mol) 3-chloropropyltriethoxysilane was then added dropwise thereto, followed by 305.3 g (0.75 mol) of a Cl-terminated polyethylene oxide polyether obtained as in Example 1 and the mixture was stirred for 5 hours at 70° C. The mixture was cooled and then filtered and the precipitated NaCl was filtered off. After evaporation, 496 g of a brown oil having a viscosity of 720 mPa sec was obtained.

Example 10

Solubility Behaviour in Ethanol

In each case 30 parts by weight of a polysulphide silyl compound were heated in 70 parts by weight of ethanol for 5 minutes at 70° C., during which the solubility in the heated solvent was assessed:

| Silyl compound | Complete solubility | Si content |
|---|---|---|
| Examples according to the invention: | | |
| Compound from Example 5 | yes | 4.7% |
| Compound from Example 6 | yes | 5.6% |
| Compound from Example 7 | yes | 3.7% |
| Compound from Example 8 | yes | 2.7% |
| Compound from Example 9 | yes | 2.9% |
| Comparison Examples: | | |
| Ex. 2 of DE-OS 2,141,160 | yes | 10.4% |
| Ex. 1 of DE-A 195 49 027 | no | 5.8% |
| Ex. 2 of DE-A 195 49 027 | no | 4.6% |
| Ex. 3 of DE-A 195 49 027 | no | 3.8% |
| Ex. 5 of DE-A 195 49 027 | no | 4.8% |

The results of the tests show that the polysulphide polyether silanes according to the invention, despite a lower content of costly silane raw material, exhibit a better solubility in the reaction medium (ethanol), so that it is possible to avoid the use of an expensive solvent mixture in the preparation process.

Example 11

Comparison of Vulcanisation Kinetics

The rubber mixtures below were prepared within 5 minutes at 140° C. in a 1.5 1 kneader. Finally, sulphur and accelerator were added thereto on a roll at approx. 50° C. The vulcanisation kinetics were investigated at 160° C. in the final mixtures by means of a Monsanto rheometer MDR 2000.

| | Comparison Examples | | | Examples according to the invention | | | |
|---|---|---|---|---|---|---|---|
| | A | B | C | D | E | F | G |
| Solution SBR Buna VSL 4020-0 (Bayer) | 75 | 75 | 75 | 75 | 75 | 75 | 75 |
| BR Buna CB 11 (Bayer) | 25 | 25 | 25 | 25 | 25 | 25 | 25 |
| Silica Vulkasil S (Bayer) | 80 | 80 | 80 | 80 | 80 | 80 | 80 |
| Carbon black Corax N 339 (Degussa) | 6.5 | 6.5 | 6.5 | 6.5 | 6.5 | 6.5 | 6.5 |
| Arom. oil Renopal 450 (Fuchs) | 32.5 | 32.5 | 32.5 | 32.5 | 32.5 | 32.5 | 32.5 |
| ZnO | 2.5 | 2.5 | 2.5 | 2.5 | 2.5 | 2.5 | 2.5 |
| Stearic acid | 1 | 1 | 1 | 1 | 1 | 1 | 1 |
| Antiozonant Vulkanox 4020 (Bayer) | 1.5 | 1.5 | 1.5 | 1.5 | 1.5 | 1.5 | 1.5 |
| Wax Antilux 654 (Rhein Chemie) | 1.5 | 1.5 | 1.5 | 1.5 | 1.5 | 1.5 | 1.5 |
| Polysulph. silane as in Ex. 1 of DE 19 549 027 | 6.5 | 0 | 0 | 0 | 0 | 0 | 0 |
| Polysulph. silane as in Ex. 2 of DE 19 549 027 | 0 | 6.5 | 0 | 0 | 0 | 0 | 0 |
| Polysulph. silane as in Ex. 3 of DE 19 549 027 | 0 | 0 | 6.5 | 0 | 0 | 0 | 0 |
| Compound according to the invention Ex. 6 | 0 | 0 | 0 | 6.5 | 0 | 0 | 0 |
| Compound according to the invention Ex. 5 | 0 | 0 | 0 | 0 | 6.5 | 0 | 0 |
| Compound according to the invention Ex. 7 | 0 | 0 | 0 | 0 | 0 | 6.5 | 0 |
| Compound according to the invention Ex. 9 | 0 | 0 | 0 | 0 | 0 | 0 | 6.5 |
| CBS Vulkacit CZ (Bayer) | 1.5 | 1.5 | 1.5 | 1.5 | 1.5 | 1.5 | 1.5 |
| DPG Vulkacit D (Bayer) | 2 | 2 | 2 | 2 | 2 | 2 | 2 |
| Sulphur | 1.5 | 1.5 | 1.5 | 1.5 | 1.5 | 1.5 | 1.5 |
| Prevulcanisation time at 160° C. (TS 06) in minutes | 2.4 | 2.2 | 2.1 | 2.8 | 3 | 3 | 2.6 |
| Vulcanisation time at 160° C. (t 90) in minutes | 14.2 | 13.5 | 13.4 | 13.5 | 12.4 | 11.5 | 12 |

It is clear that the rubber mixtures containing the compounds according to the invention exhibit a more favourable vulcanisation behaviour, that is, a longer period of workability and a shorter vulcanisation time.

Example 12

The rubber mixtures below were prepared within 5 minutes at 140° C. in a 1.5 1 kneader. Finally, sulphur andaccelerator were added thereto on a roll at approx. 50° C.

|  | Comparison Example | Examples according to the invention | |
|---|---|---|---|
|  | A | B | C |
| Solution SBR Buna VSL 5025-1 (Bayer) | 75 | 75 | 75 |
| BR Buna CB 24 (Bayer) | 25 | 25 | 25 |
| Silica Vulkasil S (Bayer) | 80 | 80 | 80 |
| Carbon black Corax N339 (Degussa) | 6.5 | 6.5 | 6.5 |
| Aromatic oil Renopal 450 (Fuchs) | 8 | 8 | 8 |
| ZnO | 2.5 | 2.5 | 2.5 |
| Stearic acid | 1 | 1 | 1 |
| Antiozonant Vulkanox 4020 (Bayer) | 1.5 | 1.5 | 1.5 |
| Wax Antilux 654 (Rhein Chemie) | 1.5 | 1.5 | 1.5 |
| Bis(triethoxysilylpropyl) tetrasulphide acc. to DE 2,255,577 | 6.5 | 0 | 0 |
| Compound as in Example 6 | 0 | 6.5 | 0 |
| Compound as in Example 7 | 0 | 0 | 6.5 |
| CBS Vulkacit CZ (Bayer) | 1.5 | 1.5 | 1.5 |
| DPG Vulkacit D (Bayer) | 2 | 2 | 2 |
| Sulphur | 1.5 | 1.5 | 1.5 |

The rubber mixtures were then vulcanised for 45 minutes at 160° C. The resulting vulcanisation properties were as follows:

|  |  |  |  |
|---|---|---|---|
| Tensile stress at 100% elongation (MPa) | 3.4 | 3.4 | 3.6 |
| Tensile stress at 300% elongation (MPa) | 13.7 | 14.5 | 13.2 |
| Tensile strength (MPa) | 19 | 18.2 | 17.9 |
| Tear resistance (MPa) | 35.1 | 43.1 | 40.2 |
| Hardness (Shore A) at 23° C. | 73 | 73 | 74 |
| Rebound elasticity at 23° C. (%) | 25 | 25 | 23 |
| Rebound elasticity at 70° C. (%) | 46 | 48 | 46 |

From the vulcanisation properties it may be seen that the polysulphide polyether silanes according to the invention, despite a considerably decreased content of costly silane raw material as compared with prior art, lead to equal mechanical properties and moreover bring about advantages in the improved relationship of wet skid resistance to rolling resistance (greater difference between the rebound elasticities at 23° C. and at 70° C.).

We claim:

1. Rubber mixtures, containing at least one rubber, a filler, optionally additional rubber auxiliaries and at least one polysulphide polyether silane corresponding to the formula $$R^1R^2R^3Si-X^1-(-S_x-\text{polyether}-)_m-(-S_x-X^2-\text{SiR}^1R^2R^3)_n \quad (I),$$

wherein

R$^1$, R$^2$ and R$^3$ are identical or different and denote C$_1$–C$_{18}$-alkyl, C$_1$–C$_{18}$-alkoxy, C$_6$–C$_{12}$-phenyl or -phenoxy, C$_7$–C$_{18}$-arylalkyl or alkylaryloxy, with the proviso that at least one of the groups R$^1$ to R$^3$ is an alkoxy, phenoxy or alkylaryloxy group, X$^1$ and X$^2$ are identical or different and represent divalent, linear or branched or cyclic, optionally unsaturated C$_1$–C$_{12}$-alkyl groups, polyether represents a bi-, tri- or tetrafunctional polyethylene oxide polyether group, polypropylene oxide polyether group, polybutylene oxide polyether group, or a corresponding mixed polyether group having an average molecular weight of from approximately 400 to 5,000, m represents an integer from 1 to 20, n represents a number from 1 to 4, and x denotes a number from 1 to 8, the polysulphide polyether silane (I) being used in quantities of from 0.1 to 15 wt. %, based on the quantity of the rubber used in each case.

2. A rubber mixture as claimed in claim 1, wherein the polyethylene oxide polyether has a molecular weight of approximately 600.

3. A rubber mixture as claimed in claim 1, wherein the polyethylene oxide polyether has a molecular weight of approximately 900.

4. A rubber mixture as claimed in claim 1, wherein the polyethylene oxide polyether has a molecular weight of approximately 1500.

5. A vulcanizate prepared from the rubber mixture of claim 1.

6. A vulcanizate prepared from the rubber mixture of claim 2.

7. A vulcanizate prepared from the rubber mixture of claim 3.

8. A vulcanizate prepared from the rubber mixture of claim 4.

* * * * *